United States Patent [19]

Hachiro

[11] Patent Number: 4,617,858
[45] Date of Patent: Oct. 21, 1986

[54] PNEUMATIC BOOSTER

[75] Inventor: Nobuaki Hachiro, Ueda, Japan

[73] Assignee: Nisshin Kogyo Kabushiki Kaisha, Japan

[21] Appl. No.: 302,857

[22] Filed: Sep. 16, 1981

[30] Foreign Application Priority Data

Sep. 26, 1980 [JP] Japan ................................ 55-134046

[51] Int. Cl.$^4$ ............................................. F01B 19/00
[52] U.S. Cl. ...................................... 92/98 D; 92/99; 92/169
[58] Field of Search ..................... 92/98 D, 166, 169.2, 92/169.3, 99; 91/369 A, 376 R

[56] References Cited

U.S. PATENT DOCUMENTS

| 4,328,738 | 5/1982 | Hamamatsu | 92/166 |
| 4,418,611 | 12/1983 | Tateoka | 91/369 A |

FOREIGN PATENT DOCUMENTS

| 2845794 | 4/1979 | Fed. Rep. of Germany | 91/369 A |
| 3027174 | 1/1981 | Fed. Rep. of Germany | 92/166 |
| 2025549 | 1/1980 | United Kingdom | 92/166 |
| 2034429 | 6/1980 | United Kingdom | 92/169 |
| 2051270 | 1/1981 | United Kingdom | 92/166 |
| 2068067 | 8/1981 | United Kingdom | 92/166 |
| 2086504 | 5/1982 | United Kingdom | 91/369 A |

Primary Examiner—Abraham Hershkovitz
Attorney, Agent, or Firm—Wegner & Bretschneider

[57] ABSTRACT

A servo mechanism for a vehicle braking system comprises a pressure housing having a front shell 2 and a rear shell 3. A tie rod 43 passes through the front and rear shells 2 and 3, and also through a power piston 4 and diaphragm 5 within the pressure housing. One end of the tie rod carries a device to be actuated by the servo mechanism, while the other end of the tie rod is secured to a vehicle body. In order to provide a fluid-tight seal around the tie rod, a boot 53 is provided, having one end 53a secured to the tie rod 43, and the other end 53c secured within a hole 4a in the piston 4. A cylindrical securing member 54 clamps the respective end 53c of the boot 53 within the hole 4a in the piston 4, and also serves to clamp together the diaphragm 5 and piston 4, in the region of their respective holes 5a and 4a through which the tie rod 43 passes.

9 Claims, 1 Drawing Figure

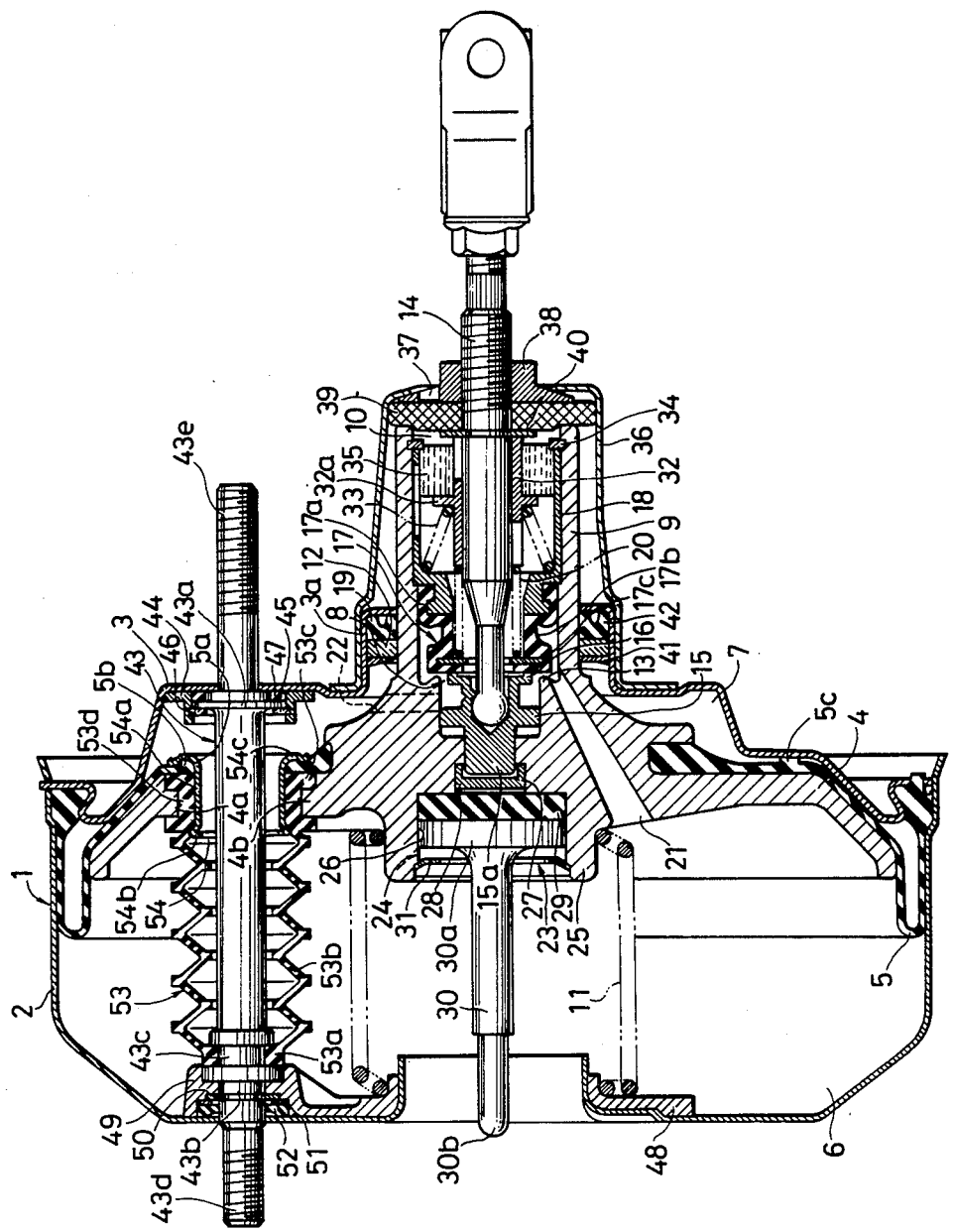

PNEUMATIC BOOSTER

BACKGROUND OF THE INVENTION

This invention relates to servo mechanisms and is particularly although not exclusively concerned with pneumatic servo mechanisms for use in vehicle braking systems or the like.

It is known to provide pneumatic servo mechansims in vehicle braking systems. With a view to reducing the thickness and weight of the housings of such mechanisms, there has been proposed a servo mechanism in which a tie rod extends through a housing and a piston within. Depending on the particular application, the tie rod may have the function of connecting together two portions of the housing, and also be adapted to be secured to a supporting surface at one end, and carry a device to be operated by the servo mechanism at the other end. In such an arrangement, the piston must be adapted to move with respect to the tie rod, and the problem therefore exists of providing a fluid-tight seal between the movable piston and the tie rod.

Preferred embodiments of the present invention aim to provide an arrangement which affords such fluid-tight sealing in such servo mechanisms.

More generally, according to the present invention, there is provided a servo mechanism comprising a pressure housing, a piston movably mounted in the housing, a diaphragm co-operating with the piston and housing to define within the housing two pressure chambers at opposite faces of the piston, a tie rod extending through the housing and piston, and a boot secured around the tie rod in a substantially fluid-tight manner, one end of the boot being secured to the tie rod or housing, and the other end of the boot being secured to the piston.

SUMMARY OF THE INVENTION

A main object of the present invention is to provide a solution to the above-mentioned problems. Thus, the present invention provides a novel tie rod type servo mechanism in which the end edge of the tie rod boot is closely clamped to the tie rod edge of the diaphragm by a cylindrical securing member so as to assure a given difference in air pressure.

For a better understanding of the invention and to show how the same may be carried into effect, reference will now be made, by way of example, to the accompanying drawing, which is a sectional view of a vacuum servo mechanism embodying the present invention, and being adapted for use in operating vehicle brakes. We refer to the servo mechanism in the following description as a "pneumatic booster".

DETAILED DESCRIPTION OF THE INVENTION

Referring to the drawing, the pneumatic booster comprises a pressure housing or booster shell shown generally at 1, including a front shell 2 and a rear shell 3 that cooperate with each other to define a pneumatic chamber. Within the chamber there is housed a power piston 4 arranged for reciprocating movement. A diaphragm 5 divides the pneumatic chamber into a first working chamber 6 at the front and a second working chamber 7 at the rear of the piston 4. The diaphragm 5 has its inner periphery secured to the rear side of the piston 4 and its outer periphery clamped between the shells 2 and 3. The first working chamber 6 is constantly in communication with a suction manifold (not shown) serving as a negative pressure source through a check valve (not shown), so that a negative pressure state is established at all times. The second working chamber 7 is designed to communicate interchangeably with the first working chamber 6 or an air inlet 10 provided in a valve guide 9 (to be described later) via a control valve 8.

The power piston 4 is always biased in the retraction direction, i.e. toward the second working chamber 7, by a booster spring 11 constrained in the first working chamber 6. The retraction movement of the piston 4 is limited by a rib 5c which is provided on the rear side of the diaphragm 5 and abuts the wall of the rear shell 3.

The power piston 4 is formed integrally with the valve guide 9, which extends in an axial direction from the centre of the rear side therof. The valve guide 9 is slidably supported by a bush 12 secured to a cylindrical extension 3a of the rear shell 3, of which the rear end is open to provide the air inlet 10 as mentioned above.

Assembling of the control valve 8 within the valve guide 9 is accomplished in the following manner.

The valve guide 9 is formed internally at the front thereof with a first annular valve seat 13, which is in sliding engagement with a valve piston 15 connected to the front of an input rod 14 of the booster. The valve piston 15 is provided at its rear end with a second annular valve seat 16 concentric with the first valve seat 13.

The base end 17a of a poppet valve 17 is secured within the valve guide 9 by means of a valve stopper 18 which is fitted in the valve guide 9. The poppet valve 17 is formed of an elastomeric material such as rubber, and has a thinner intermediate portion 17b extending inwardly of the base end 17a. A thicker valve portion 17c is provided adjacent the intermediate portion 17b and faces the first and second valve seats 13 and 16. The valve portion 17c is provided therein with an annular reinforcing plate 19 which is adapted to receive the action of a spring 20 such that the valve part 17c is biased towards both valve seats 13 and 16. This causes deformation of the intermediate portion 17b, with back or forward movement of the valve portion 17c.

Communication is constantly maintained between the outer side of the first valve seat 13 and the first working chamber 6 via a slot 21 formed in the power piston 4. A portion located between the first and second valve seats 13 and 16 communicates with the second working chamber 7 via another slot 22. The inside of the second valve seat 16 communicates with the air inlet 10 via the interior of the poppet valve 17.

A boss 25 having therein a stepped 24 for accommodation of a reaction mechamism 23 is formed on the central front side of the power piston 4. As illustrated, the stepped bore 24 includes a larger diameter portion 26 which is open at the front of the boss 25 and a smaller diameter portion 27 which is contiguous thereto. The portion 27 is adapted to receive slidingly a reaction plate 28, while the portion 26 is adapted to receive slidingly a reaction rubber 29 and a piston part 30a of an output rod 30 of the booster, so that an end 30b of the rod 30 extends in front of the front shell 2. To prevent disengagement of the piston part 30a of the piston rod 30 from the portion 26, a circlip 31 is fixedly provided on the inner peripheral wall of the portion 26, to face the front of the piston part 30a.

A stub 15a extending from the front end face of the valve piston 15 is located in the portion 27 opposite the rear end face of the reaction plate 28.

Between the valve stopper 18 secured to the valve guide 9 and a spring seat 32 fixed to the input rod 14, there is provided a return spring 33 which biasses the rod 14 towards the rear end thereof. Such movement of the input rod 14 is limited by a flange part 32a which is formed on the seat 32 and abuts the front end face of an element 35 which is restrained from moving back within the valve stopper 18 by a snap ring 34.

Between the cylindrical extension 3a of the rear shell 3 and the input rod 14, there is provided a dust-proof cover 36 for the valve guide 9. An adjuster 38, provided therein with a slot 37 in such a manner that the air inlet 10 is not closed, is threaded onto the input rod 14. A filter element 39 is further mounted on the input rod 14 such that it is interposed between the adjuster 38 and the air inlet 10. An E-ring 40 is provided for fixing of the element 39 relative to the adjuster 38.

A bush stopper 41 and a piston seal 42 are also provided, around the valve guide 9.

A tie rod shown generally at 43 passes through the front shell 2, the power piston 4, the diaphragm 5 and the rear shell 3. The tie rod 43 has a large diameter portion 43a which is caused to abut upon the rear shell 3 by a circlip 46 fitted in a groove 45 formed in a locking element 44 mounted on said shell. This assures that any dislocation of the tie rod is avoided. The portion 43a is also locked by an O-ring 47 disposed between it and the rear shell 3, said O-ring giving airtightness to the portion through which the rod passes. With respect to the front shell 2, on the other hand, an E-ring 50 fitfed in a groove 43b formed in the tie rod 43 is caused to abut upon a locking member 49 formed integrally with a spring retainer 48 for the booster spring 11. To assure airtightness of the portions through which the tie rod passes, a seal plate 51 and a tie rod seal 52 are interposed between the E-ring 50 and the front shell 2. The portions of the power piston 4 and the diaphragm 5 through which the tie rod passes are formed with through-holes 4a and 5a of a larger diameter to render the sliding movement thereof easy.

A tie rod boot shown generally at 53 has one end 53a fixedly locked in a locking groove 43c in the tie rod 43. A bellows 53b is coupled to the end 53a such that it surrounds the tie rod 43 within the first working chamber 6. The boot 53 is provided at its other end 53c with a radially outwardly opened annular locking groove 53d which tightly abuts an annular projection 4b facing radially inwardly of the through-hole 4a in the power piston 4. This serves to keep the portions through which the tie rod passes airtight. The rear face of the said other end 53c of the tie rod boot 53 abuts tightly the edge 5b of the through hole 5a in the diaphragm 5.

A cylinder securing member made of metal or synthetic resin is shown generally at 54 and includes a first cylindrical body portion 54a, the outer periphery of which clamps the inner periphery of the said other end 53c of the tie rod boot 53 as a press-fit onto the inner periphery of the through-hole 4a in the power piston. At its inner end 54b, the securing member 54 is flared radially outwardly, to engage within the bellows portion 53b of the boot 53. The securing member 54 is provided with a second radially extending end flange 54c, which clamps the side of the hole edge 5b of the diaphragm 5 to the said other end 53c of the tie rod boot 53. This assures that the hole edge 5b of the diaphragms 5 and the said other end 53c of the boot 53 are held tightly in the through-hole 4a of the power piston 4. It will be seen that the hole edge 5a of the diaphragm 5 is formed with a rib, and the end flange 54c of the securing member 54 has a correspondingly shaped portion which engages therewith as a press-fit. As an alternative or in addition, the boot 53 may be formed with an end portion to press-fit over the hole edge 5b of the diaphragm 5.

A projection 43d extending from the front end of the tie rod 43 is connected to a device such as a brake fluid master cylinder joined to the end 30b of the output rod 30, while a projection 43e extending from the rear end of the tie rod is coupled to a vehicle body.

Operation of the illustrated negative pressure type booster will now be described.

Initially, the input rod 14 and the power piston 4 are held at their retraction positions by the springs 33 and 11. The second valve seat 16 on the valve piston 15 engages the valve part 17c under the bias of the return spring 33. The valve part 17c is spaced away from the first valve seat 13. Thus, the first working chamber 6 constantly supplied with a negative pressure is in communication with the second working chamber 7 via the slots 21 and 22, while the front open part of the valve 17 is closed by the second valve seat 16. As a consequence, the negative pressure maintained in the first working chamber is conveyed to the second working chamber 7 so that both chambers 6 and 7 are well-balanced with respect to air pressures, and the power piston 4 is placed under the control of the booster spring 11.

When the input rod 14 and the valve piston 15 are moved forwards by application of a push to a brake pedal (not illustrated) so as to apply the brakes of a vehicle, the valve part 17c, biased forwardly by the spring 20, follows forward movement of the valve piston 15 until it abuts the first valve seat 3, whereupon communications are interrupted between the slots 21 and 22 and, hence, between both working chambers 6 and 7. At the same time, the second valve seat 16 is spaced away from the valve part 17c, so that the second working chamber 7 is put in communication with the air inlet 10 via the slot 22 and the inerior of the valve 17. Consequently, an amount of air is admitted into the second working chamber 7 so that the chamber 7 is maintained at a pressure higher than that prevailing in the first working chamber 6. A resultant difference in air pressure between both chambers 6 and 7 causes advancement of the power piston 4 against the action of the booster spring 11. In addition, the output rod 30 is advanced through the reaction plate 28 and the reaction rubber 29, so that a master cylinder (not illustrated) is operated for braking.

The said other end 53c of the tie rod boot is also moved forwards with advancement of the power piston such that the bellows 53b is contracted.

When the stub 15a of the valve piston 15 is moved forwardly to abut the reaction rubber 29 via the reaction plate 28, the reaction transmitted from the output rod 30 to the rubber 29 is fed back to the brake pedal via the reaction plate 28 and the valve piston 15, with the result that the operator can detect a resultant braking force.

Upon release of a push impressed on the brake pedal, retraction of the input rod 14 takes place under the influences of the reaction acting on the valve piston 15 and the return sping 33, whereby the second valve seat 16 abuts the valve part 17c, which is then spaced from the first valve seat 13. Consequently, communication is re-established between the slots 21 and 22 so that both working chamber 6 and 7 are well-balanced with respect to air pressures. The power piston 4 is then retracted by the booster spring 11 until the bellows 53b of the boot 53 is extended.

In the illustrated pneumatic booster, no gap or space is formed between the tie rod boot 53 and the power piston 4 even when extension or contraction of the boot 53 takes place in the braking operation. This is because the end of the tie rod boot 53 is tightly held on the power piston 4 together with the diaphragm by means of the cylindrical securing member 54. There is also no possibility that dislocation or disengagement of the boot 53 may occur. Since the portions through which the tie rod 43 passes are kept in an airtight state, the braking operation can be effected in a satisfactory manner with no fear of malfunctions.

What is claimed is:

1. A servo mechanism comprising a pressure housing having a front and a rear, a piston movably mounted in the housing, a diaphragm co-operating with the piston and housing to define within the housing a first pressure chamber at the front of the piston and a second pressure chamber at the rear of the piston, a tie rod extending through the front of the housing, the piston, the diaphragm, and the rear of the housing, successively, and a boot in the form of a bellows surrounding the tie rod within the first chamber in a substantially fluid-tight manner, on end of the boot being secured to the front end of the tie rod, and the other end of the boot secured in position to the piston wherein said other end of the boot is secured in position by means of a cylindrical member which engages within the boot and co-operates with at least one of the piston and the diaphragm such that the passage of the tie rod through the piston and the diaphragm are kept airtight, wherein said cylindrical member has a first cylindrical portion which serves to clamp said other end of the boot between said first portion and the inner periphery of a hole in the piston, and a second radially extending end portion which engages the diaphragm around a hole therein, such that the boot and diaphragm are clamped tightly together.

2. A servo mechanism according to claim 1, wherein a rib is formed around said hole in the diaphragm, and said second portion of the cylindrical member is formed with a complementary portion which engages said rib.

3. A servo mechanism according to claim 1 or 2, wherein said cylindrical member has a radially outwardly flared inner end portion.

4. A servo mechanism according to claim 1, wherein the boot is formed at said other end with a securing portion which engages a complementary securing portion on said piston.

5. A servo mechanism according to claim 4, wherein said securing portions comprise at least one annular rib and complementary groove.

6. A servo mechanism according to claim 1, wherein said pressure housing comprises two housing portions which are secured together and through which said tie rod passes.

7. A servo mechanism according to claim 1, being a pneumatic servo mechanism combined with a vehicle braking system or the like.

8. A servo mechanism according to claim 7, combined with a motor vehicle.

9. A servo mechanism according to claim 1, wherein one end of the tie rod is adapted to be secured to a supporting surface, and the other end is adapted to be secured to a device to be operated by the servo mechanism.

* * * * *